Oct. 19, 1948.　　　　E. C. WAHLBERG ET AL　　　　2,451,998
BALL BEARING WORM GEAR
Filed Feb. 3, 1945
2 Sheets-Sheet 1
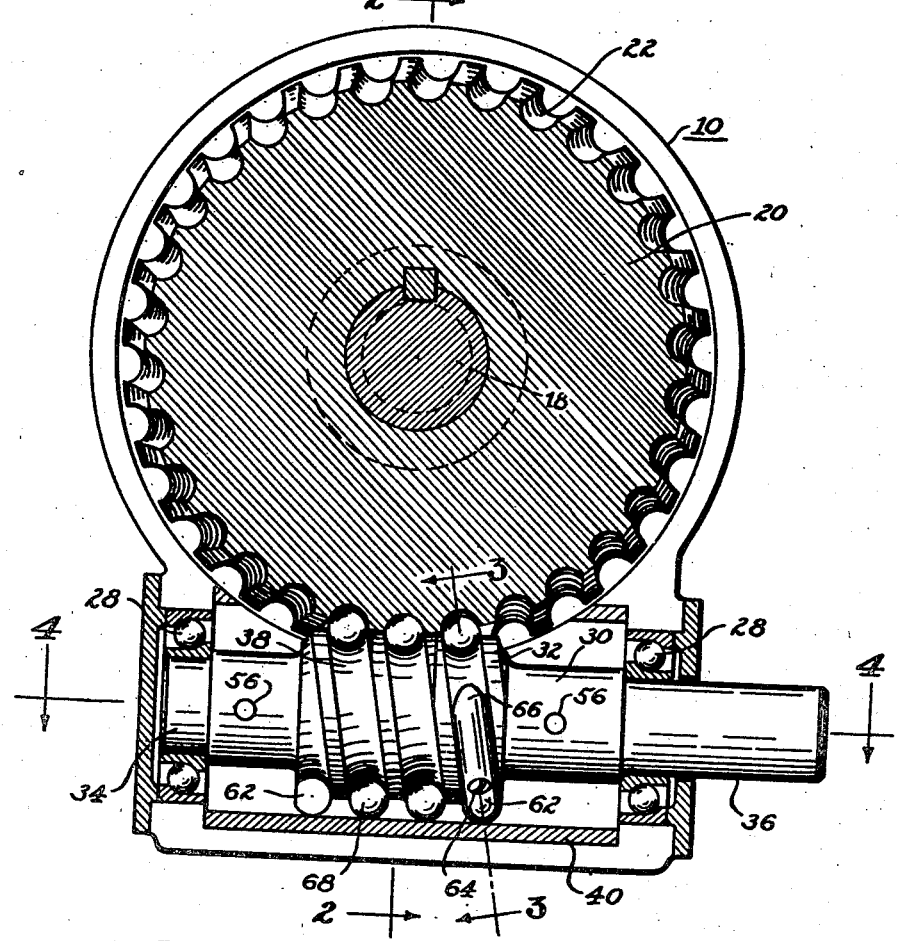
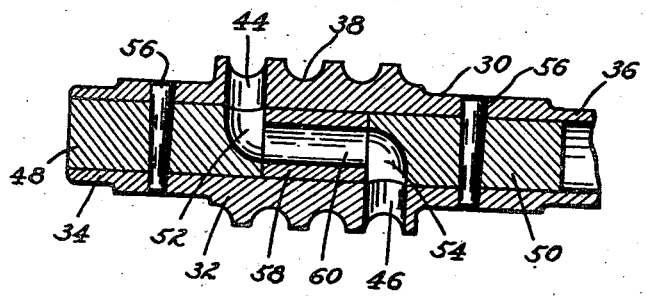
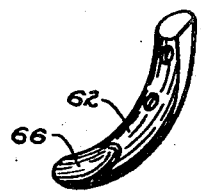
INVENTORS Oct. 19, 1948.  E. C. WAHLBERG ET AL  2,451,998
BALL BEARING WORM GEAR
Filed Feb. 3, 1945                                       2 Sheets-Sheet 2
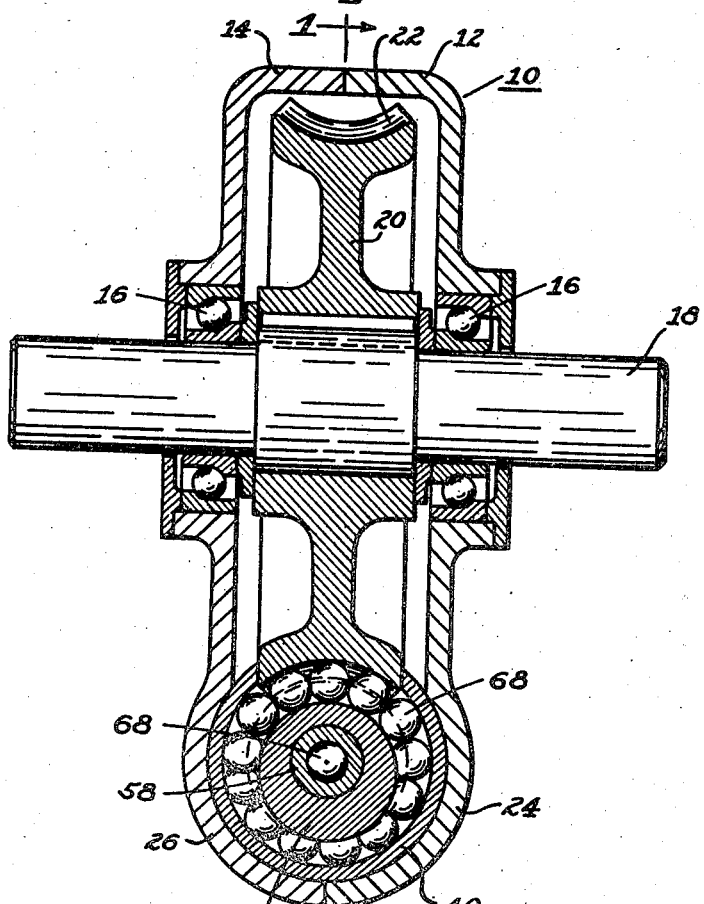
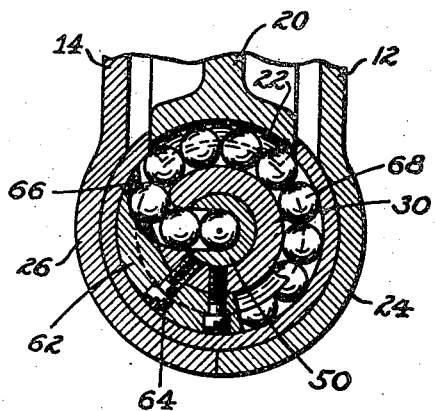
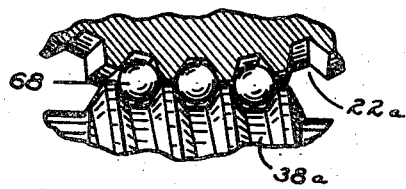
INVENTORS Patented Oct. 19, 1948

2,451,998

UNITED STATES PATENT OFFICE 2,451,998

BALL-BEARING WORM GEAR

Eric C. Wahlberg and Robert C. Lampe, Stamford, Conn., assignors to Electrolux Corporation, New York, N. Y., a corporation of Delaware Application February 3, 1945, Serial No. 576,070

3 Claims. (Cl. 74—458)

Our invention relates to improved worm gearing and more particularly to gearing of this type in which balls are provided for transmitting the torque between the worm and the worm gear in order to eliminate sliding friction between these members to thereby materially increase the efficiency of the gearing.

In accordance with our invention the worm gear is provided with a plurality of spaced recesses extending across its peripheral edge, while the worm is formed with a spiral groove having a lead equal to the spacing of the aforesaid recesses. If the gearing is intended for continuous rotation, opposite ends of this spiral groove are connected together by means of a passageway extending through the interior of the worm. The spiral groove and connecting passageway are occupied by a plurality of balls of a size such that they extend out of the groove a distance substantially equal to their radii. The worm and worm gear are mounted on shafts extending at right angles to each other and so spaced that adjacent recesses in the gear are in alignment with successive turns of the spiral groove on the worm. Hence, the balls which are in those portions of the groove which are in alignment with the recesses enter the latter in much the same manner that the spiral tooth on an ordinary worm enters the spaces between the teeth on an ordinary worm gear. However, due to the fact that the balls are not fixed with respect to either of these members, they may roll between them during rotation of the gearing, thus transmitting torque from one member to the other without sliding friction. A cylindrical retainer member is provided for retaining the balls in those portions of the spiral groove which are not in alignment with the recesses of the gear, and as the gearing rotates the balls advance through the spiral groove and pass back through the interior passageway in the worm to the other end of the groove.

Due to the above briefly described construction, a single set of balls is able to transmit torque during rotation of the gearing in either direction.

Further objects and advantages of our invention will be apparent from the following description considered in connection with the accompanying drawings which form a part of this specification and in which:

Fig. 1 is a cross sectional view of a preferred embodiment of my invention and is taken on the line 1—1 on Fig. 2;

Fig. 2 is a cross sectional view taken on the line 2—2 of Fig. 1;

Fig. 3 is a cross sectional view of a portion of the gearing and is taken on the line 3—3 of Fig. 1;

Fig. 4 is a cross sectional view of the worm and is taken on the line 4—4 of Fig. 1;

Fig. 5 is a perspective view of one of the elements shown in the preceding figures, and Fig. 6 is a fragmentary view illustrating a groove and recesses having a somewhat different shape in section from that shown in the preceding figures.

Referring to the drawings, reference character 10 indicates generally a gear casing including parts 12 and 14 meeting along the central line of the casing and, when in assembled relation, secured together in a suitable manner, preferably by bolts. The side walls of the casing parts 12 and 14 are formed with openings in which are received suitable anti-friction bearings such as the ball bearings 16. These bearings rotatably support a shaft 18 to which is rigidly secured what may be termed a worm gear 20, although it is of novel construction.

The peripheral edge face of the worm gear 20 is concave and has formed therein a plurality of spaced semi-circular recesses 22 which extend across the face at an angle with respect to the axis of the gear.

The side walls of the casing parts 12 and 14 merge into semi-cylindrical housing parts 24 and 26. The ends of the latter parts are formed with openings in which are mounted anti-friction bearings such as the ball bearings 28 which rotatably support a worm 30 of novel construction. The bearings 16 and 28 are so located with respect to each other that the axes of rotation of the gear 20 and the worm gear 30 are substantially at right angles to each other.

As is shown more particularly in Fig. 4, the worm 30 is hollow and has an enlarged central portion 32 which is preferably integral with end portions 34 and 36 which end portions are supported by the bearings 28. The enlarged portion 32 is formed with a spiral groove 38 extending therearound. The radius of the cross-section of this groove is substantially equal to the radii of the recesses 22 in the worm gear and the lead of the groove is equal to the spacing between adjacent recesses while the angle between each recess and the axis of the gear is equal to the pitch angle of the spiral groove. Consequently, successive turns of the groove are in alignment with successive recesses, as is clearly shown in Fig. 1. Moreover, the radius of the concave peripheral face of the worm gear 20 is substantially equal to the radius of the enlarged portion 32 of the worm and consequently, the concave face is substantially parallel to and embraces a portion of the cylindrical face of the worm as is clearly apparent from Figs. 2 and 3. The central portion of worm 32 for a distance equal to at least the pitch of the spiral groove, is given an hour-glass shape so as to present a concave section in an axial plane, as in Fig. 1, the radius of this concave surface being substantially equal to the radius of the worm gear.

The worm 30 is enclosed within a cylindrical retainer member 40 which is fixed within the semi-cylindrical parts 24 and 26 of the gear casing. This retainer is formed with an axially extending slot having a circumferential width substantially equal to the axial width of the gear 20, as is clearly shown in Figs. 2 and 3, so that the gear may rotate within this slot with small clearance.

As is more particularly shown in Fig. 4 the worm 30 is formed with radial passages 44 and 46 which communicate with opposite ends of the spiral groove 38. Within the hollow worm there are secured filler members 48 and 50 in which are formed elbow passages 52 and 54, the radially outer ends of which connect with passages 44 and 46, respectively. The members 48 and 50 are secured in fixed relation in the worm by any suitable means such as the drive pins 56. Between the members 48 and 50 there is located a sleeve 58 having an axially extending bore 60 which connects together the inner ends of the elbow passages 52 and 54. The radius of the passage which is thus formed for connecting the opposite ends of the spiral groove is substantially equal to the radius of this groove.

A plurality of balls 68 occupies the entire length of the groove and the connecting passage. The radii of these balls are slightly less than the radii of the spiral groove and recesses. Consequently, the balls which at any instant are in those portions of the groove which are in alignment with recesses in the worm extend into the latter recesses, while the remaining balls in the groove are retained therein by means of the retainer 40.

A scoop member 62 is secured to the worm 30 in each end of the spiral groove 38 by means of screws 64 in such a position that a curved lip 66 of each scoop overlies the outer ends of the radial passages 44 and 46 so as to guide and direct the movement of the balls 68 from one end of the groove into the radial passage at that end and from the other radial passage into the opposite end of the groove. The outer face of the scoop 62 is curved in both planes, as will be seen in Figs. 1 and 3, and the size of the scoop is such that it may pass freely through the recesses 22 in the worm gear as the gearing rotates.

The above described device operates as follows:

If the worm 30 is the driving member, as is usual in worm gearing, rotation thereof causes those portions of the spiral groove which are in alignment with the recesses of the worm gear to advance axially in one direction or the other, depending upon the direction of rotation of the worm. Consequently, the balls 68 which are in the adjacent portions of the spiral groove are forced to move in a direction having an axial component with respect to the worm and hence, tangentially with respect to the worm gear 20 thus causing rotation of the latter about its axes. In doing this the balls are placed in compression between one side of the recess in the worm gear and the opposite side of the spiral groove. Due to the fact that the balls are free to roll, sliding friction is eliminated and only rolling friction results. As the gearing rotates the balls advance from one end of the groove towards the other and as they reach the end they are guided by one of the scoops 62 so as to enter the interior passage through the worm and are thus returned to the opposite end of the groove. Due to the fact that the worm gear is circular while the face of the worm is straight in the plane of Fig. 1, except for the slight hour-glass shape of its central portion, only the balls which occupy the center turn of the groove are under load. However, as is shown in Fig. 2 the width of the peripheral edge of the worm gear is such that there is a plurality of balls in this turn among which the load is distributed. For the same reason that the balls in the end turns of the groove are not loaded, the scoop 62 may pass through the recesses in the worm gear without being subjected to sliding friction thereagainst.

Inasmuch as the balls 68 contact the interior of retainer 40, the worm 30 is supported centrally against bending as a result of the radial thrust imposed on the worm due to the tendency of the worm and worm gear to separate when under load. Preferably, the parts are so dimensioned with respect to the strength of the material that the worm is supported in this manner against bending only under the thrust resulting from a substantial overload, while the thrust under conditions of normal load does not deflect the worm and hence, is carried by the bearings 28.

Due to the fact that both the recesses in the worm gear and the groove in the worm are open radially outwardly with respect to the member in which they are formed, the balls which extend from the groove into the recesses are capable of transmitting thrust in either direction and hence, the gearing may rotate in either direction although employing but a single set of balls and hence, requiring but a single ball return passage.

While the recesses and spiral groove have been shown as semi-cylindrical in section, it is obvious that they could have other shapes, such as is illustrated in Fig. 6 where the recesses 22a and groove 38a are polygonal in cross-section.

If the gearing is not intended for continuous rotation, as for instance if it is to be used in the steering gear of an automobile, the scoops and the return passage for the balls may be omitted, and the spiral groove not completely filled with balls so that there is space at both ends of the groove when the steering gear is in mid-position. Hence, as the steering wheel is turned to the right and the left, the balls merely travel back and forth in the spiral groove.

Because of the high mechanical efficiency of this gearing due in turn to the complete elimination of sliding friction between the loaded parts, the worm gear 20 may be the driving member. In other words, the gearing is not irreversible, as is usually the case with worm gearing having a high gear ratio.

While we have shown a more or less specific embodiment of our invention, it is to be understood that this has been done for the purpose of illustration only and that the scope of our invention is not to be limited thereto, but is to be determined from the appended claims.

What we claim is:

1. Worm gearing comprising a worm gear having recesses extending across its peripheral edge, a hollow worm having a spiral groove extending therearound and having radial passages connecting opposite ends of said groove with the hollow interior, a pair of members within said interior formed with elbow passages opening in radial and axial directions, said members being located with the radial openings communicating with the inner ends of said radial passages, a sleeve in said interior between said members and having an axial bore connecting the axial openings in the members to thereby provide a passageway connecting opposite ends of said spiral groove, means for rotatably mounting said worm gear and said worm about axes substantially at right angles to each other and so that successive turns of said spiral groove are in alignment with successive recesses, a plurality of balls in said spiral groove and passageway and extending into the recesses which are in alignment with the groove, and means for retaining the balls in those portions of said groove which are not aligned with said recesses.

2. Worm gearing comprising a housing, a worm gear rotatably mounted in said housing and having recesses extending across its peripheral edge, a worm rotatably mounted in said housing on an axis substantially at right angles to the axis of said worm gear, said worm having a spiral groove extending therearound, the opposite ends of said spiral groove being connected by a passageway extending through the interior of said worm, the spacing of said recesses and the pitch of said groove being such that successive turns of the groove are in alignment with successive recesses, a plurality of balls in said spiral groove and passage and extending into the recesses which are in alignment with said groove, said housing being divided into two parts along a plane normal to the axis of said worm gear, and a one-piece cylindrical retainer removably clamped between the two parts of said housing and around said worm, said retainer being formed with a slot through which said worm gear extends and serving to retain the balls in those portions of said groove which are not aligned with said recesses.

3. Worm gearing comprising a worm gear having recesses extending across its peripheral edge, a worm formed with an axial bore extending in from at least one end of the worm, said worm having an external spiral groove extending therearound and having radial passages connecting opposite ends of said groove with said bore, within said worm providing a smooth passageway connecting said radial passages whereby said passageway and passages form a ball return from one end of said groove to the other, said means including a pair of members formed with elbow passages opening in radial and axial directions, said members being located within said bore with the radial openings communicating with the inner ends of said radial passages and with the axial openings aligned with each other, means for rotatably mounting said worm gear and said worm about axes substantially at right angles to each other and so that successive turns of said spiral groove are in alignment with successive recesses, a plurality of balls in said ball return and said spiral groove and extending into the recesses which are in alignment with the groove, and means for retaining balls in those portions of said groove which are not aligned with said recesses.

ERIC C. WAHLBERG.
ROBERT C. LAMPE.

REFERENCES CITED

The following references are of record in the file of this patent:

UNITED STATES PATENTS

| Number | Name | Date |
| --- | --- | --- |
| 506,409 | Wellman | Oct. 10, 1893 |
| 1,152,001 | Brinkman | Aug. 21, 1915 |
| 2,403,096 | Slarie | July 2, 1946 |

FOREIGN PATENTS

| Number | Country | Date |
| --- | --- | --- |
| 19,325 | Great Britain | 1905 |
| 558,710 | France | May 30, 1923 |
| 575,221 | France | Apr. 17, 1924 |